United States Patent [19]

Nanai et al.

[11] 4,220,101
[45] Sep. 2, 1980

[54] AUTOMATIC PATTERN GENERATION TYPE SEWING MACHINE

[75] Inventors: Sadaaki Nanai; Akinobu Iwako, both of Tokyo, Japan

[73] Assignee: Kabushiki Kaisha Yaskawa Denki Seisakusho, Kitakyushu, Japan

[21] Appl. No.: 945,119

[22] Filed: Sep. 25, 1978

[30] Foreign Application Priority Data

Oct. 4, 1977 [JP] Japan .............................. 52-120269

[51] Int. Cl.² ......................................... D05B 3/02
[52] U.S. Cl. .............................................. 112/158 E
[58] Field of Search .......... 112/158 E, 121.12, 121.11, 112/275, 277

[56] References Cited

U.S. PATENT DOCUMENTS

| | | | |
|---|---|---|---|
| 3,742,878 | 7/1973 | Byrne et al. | 112/121.12 |
| 3,977,338 | 8/1976 | Wurst et al. | 112/158 E X |
| 3,984,745 | 10/1976 | Minalga | 112/158 E X |
| 4,122,786 | 10/1978 | Tanimoto et al. | 112/158 E |
| 4,142,473 | 3/1979 | Itoh | 112/158 E |

FOREIGN PATENT DOCUMENTS

| | | | |
|---|---|---|---|
| 2757735 | 6/1978 | Fed. Rep. of Germany | 112/158 E |
| 2813220 | 10/1978 | Fed. Rep. of Germany | 112/158 E |
| 51-36414 | 8/1976 | Japan | 112/121.12 |

Primary Examiner—Peter P. Nerbun
Attorney, Agent, or Firm—Fitzpatrick, Cella, Harper & Scinto

[57] ABSTRACT

In an automatic pattern generation type sewing machine, a function generating device generates stitch positions using a signal synchronous with the rotation of the armshaft of the sewing machine, a digital signal generating device provides digital signals corresponding to the stitch positions, and a servo driving device, using the digital signals, moves the cloth or the needle, to thereby form a variety of geometrical stitch patterns automatically.

8 Claims, 14 Drawing Figures

AUTOMATIC PATTERN GENERATION TYPE SEWING MACHINE

BACKGROUND OF THE INVENTION

This invention relates to a sewing machine in which a plurality of geometrical patterns are automatically generated by using a specially designed calculator.

In a first prior art of automatically generating stitch patterns, the stitch patterns are stored in the digitally determined order in a paper sheet, a magnetic tape, or a static memory device. Accordingly, in order that a number of stitch patterns are stored, it is necessary to provide memory devices the number of which is in proportion to the number of stitch patterns and the number of stitches. If it is required to form a special stitch pattern, the operator has to digitally code every stitch of the pattern before inputting it into the memory.

In a second prior art, employed is a function generating device which is used in the numerical control of tool machines or in automatic drafting machines.

In forming a circle, for instance, with a numerical control device, the diameter or radius and the position of the center of the circle are set, coordinate positions approximating the circle are successively and automatically calculated, and the calculated results are pulse-distributed by using digital code signals. Thus, formation of a graphic form is automatically carried out by the function generating device, and the pattern of the graphic form itself is not made by the memory device.

Graphic information outputted by the function generating device is digitized. In order to determine mechanical positions thereof according to coordinate axes such as X-axis and Y-axis, the graphic information is transmitted to a stepping motor or the like, or it is subjected to digital-to-analog conversion before being transmitted to a servo driving device with position and speed feedback.

SUMMARY OF THE INVENTION

Accordingly, an object of this invention is to improve the function generating device employed in the aforementioned second prior art.

More specifically, an object of the invention is to provide an automatic pattern generation type sewing machine in which the function generating device employed in the second prior art is improved, so that a variety of geometrical stitch patterns are formed by using an automatic pattern generating circuit without successively storing information on stitches in the stitch patterns.

This object and other objects of the invention have been achieved by the provision of an automatic pattern generation type sewing machine which comprises: a function generating device for generating through calculation stitch positions in the form of a stitch pattern by using a signal synchronous with a rotation of the arm shaft of the sewing machine; a digital signal generating device for outputting digital signals corresponding to the stitch positions; and a servo driving device which employs the digital signals as feed and bight positions of the needle of the sewing machine to move a piece of cloth or the needle.

The novel features which are considered characteristic of this invention are set forth in the appended claims. The invention itself, however, as well as other objects and advantages thereof will be best understood by reference to the following detailed description of illustrative embodiments, when read in conjunction with the accompanying drawings.

DETAILED DESCRIPTION OF THE INVENTION

A function generating device employed in this invention employs as its fundamental principle a pulse distribution system according to a topological space method which has been disclosed by Japanese Patent Application No. 53692/1972 filed on May 29, 1972; however, the invention is not limited thereto or thereby. That is, various function generating devices may be employed in which a count type integration analysis device, an algebraic calculation system, a curve interpolation device disclosed by Japanese Patent Publication No. 37962/1971, or a function generating system by Japanese Patent Application No. 25093/1970 is utilized.

As conducive to a full understanding of the invention, first the topological space method mentioned above will be briefly described.

Figure 1:
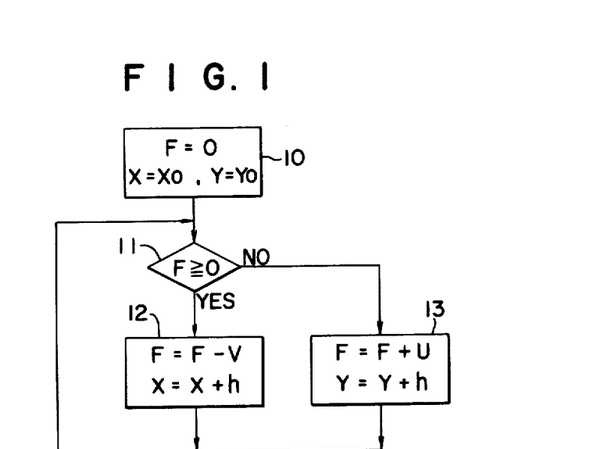
FIG. 1 is a flow chart for tracking a plane curve.

A plane curve $F(X, Y) = 0$ can be expressed by the following Equation (1):

$$dY/dX = V(X, Y)/U(X, Y) \qquad (1)$$

where U and V are the positive values. In this connection, an algorithm of tracking the plane curve $F(X, Y) = 0$ from a point P $(X_0, Y_0)$ on it is as follows:

FIG. 1 is a flow chart showing a method of tracking the plane curve $F(X, Y) = 0$. In the flow chart, reference numeral 10 designates an initial condition. If $F \geq 0$ according to a decision 11, advancement is effected by an interpolation pitch h in the direction of X-axis through a calculation 12 to subtract a value V; and if $F < 0$, then advancement is made by the interpolation pitch h in the direction of Y-axis through a calculation 13 to add a value U. In order to increase the value F, in the case of a circle, the movement is made outwardly of the circle.

The above description has been made with a premise that the movement is made in the direction of Y-axis. However, when it is required to make the movement in the direction of X-axis, the requirement can be accomplished by replacing X and Y in the calculations 12 and 13 with each other.

Figure 2:
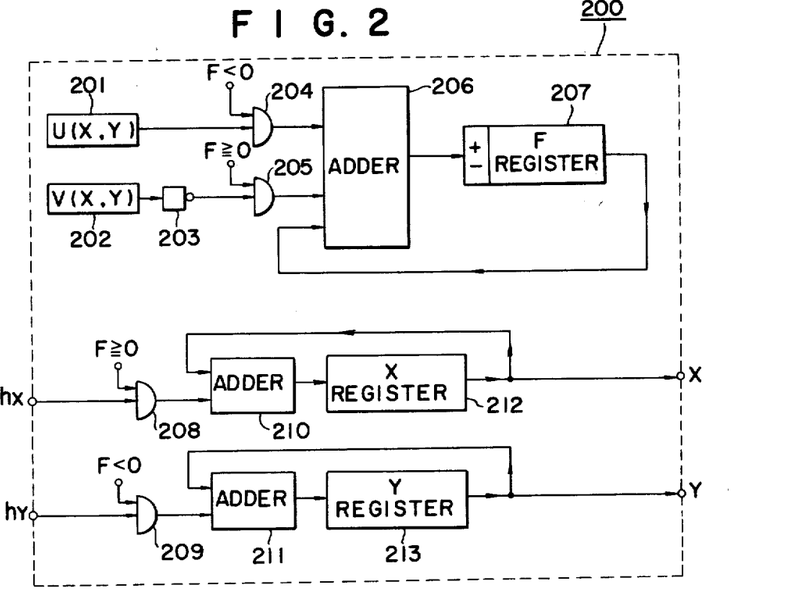
FIG. 2 is a block diagram showing an electrical circuit equivalent to the flow chart shown in FIG. 1.

FIG. 2 is a block diagram showing a function generating device 200 having an electrical circuit equivalent to that of the flow chart shown in FIG. 1. The function generating device 200 comprises: registers 201 and 202 for storing functions U(X,Y) and V(X,Y) of X and Y in Equation (1), respectively; an auxiliary circuit 203 for inverting the sign of an input value; logical (AND) gates 204 and 205; an adder 206; and a register 207 for determining whether the advancement should be made in the direction of X or in the direction of Y in tracking the curve. The register 207 determines whether an X pulse should be provided or a Y pulse according to the sign of contents therein. The function generating device 200 further comprises: logical (AND) gates 208 and 209; adders 210 and 211; and registers 212 and 213. In FIG. 2, reference characters hx and hy designate interpolation pitches with respect to X and Y, respectively, and h=hx=hy.

Figure 3:
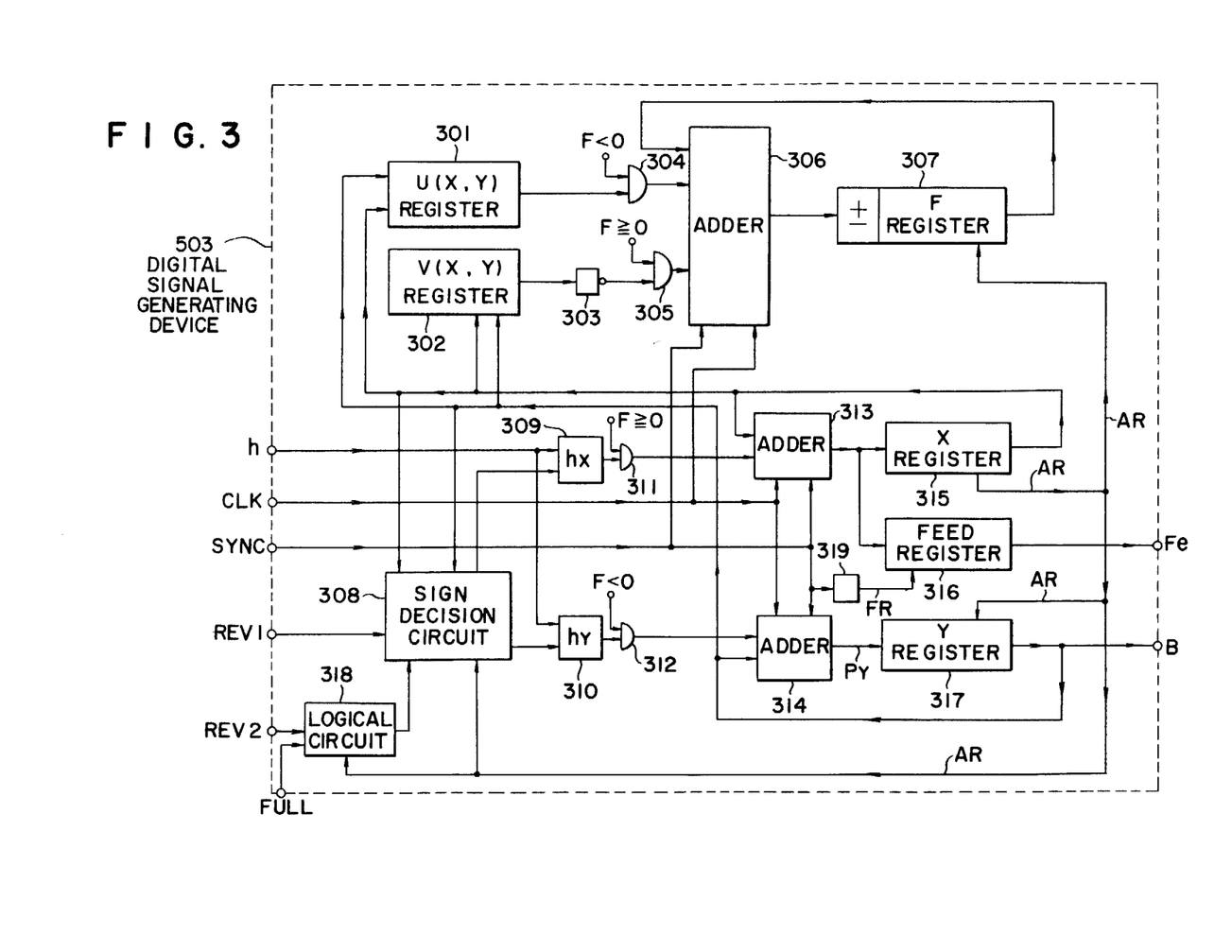
FIG. 3 is a block diagram illustrating a digital signal generating device according to the invention.

Shown in FIG. 3 is a block diagram showing one example of a digital signal generating device 503 employed in the invention. The digital signal generating device 503 includes the function generating circuit 200 shown in FIG. 2, and more specifically comprises: registers 301 and 302, a complementer 303; logical (AND) gates 304 and 305; an adder 306; and a register 307.

In this example, a function configuration is a circle (or a semi-circle); however, it may be other configurations such as for instance an ellipse.

$$F(X,Y) = X^2 + Y^2 - R^2 = 0 \text{ (where R is the radius)}$$

Therefore, $dY/dX = -(X/Y)$, and $U(X,Y) = Y$, and $V(X,Y) = X$ are applied to the registers 301 and 302, respectively.

The interpolation pitch h is applied to an interpolation pitch setting circuit 309 with X-axis sign and an interpolation pitch setting circuit 310 with Y-axis sign, and it is outputted after its sign (negative or positive) is determined by a sign decision circuit 308.

The digital signal generating circuit 503 in FIG. 3 further comprises: logical (AND) gates 311 and 312; adders 313 and 314; an X register 315, a feed register 316; a Y register 317 which is a kind of counter which counts up with the aid of addition pulses from the adders 313 and 314, the output thereof being parallel data. The feed register 316 outputs a relative displacement data Fe in the direction of the X-axis, or in the direction of the coordinate axis of an amount of feeding (a cloth). The Y register 317 outputs an absolute displacement data B in the direction of the coordinate axis of an amount of bight, or in the direction of a needle position coordinate axis.

Numerical values from the X register 315 and the Y register 317 are applied to the registers 301 and 302 at all times.

The initial state of the sign decision circuit 308 is determined by whether reverse calculation instructions REV1 and REV2 are available or not. Thereafter, the signs of the interpolation pitches hx and hy with respect to X and Y are successively determined according to the value of the Y register 317.

In general, the initial values of the interpolation pitches hx and hy with respect to X and Y are both positive, and the interpolation pitch with respect to Y is changed to negative at the maximum point of the circle. Thus, semi-circles are generated with a semi-circle as a period. When the reverse calculation instructions REV1 is available, the interpolation pitch hx with respect to X becomes negative. When the reverse calculation instruction REV2 is provided, the interpolation pitch hx with respect to X repeats a cycle of (positive→negative) in a fundamental block unit.

A signal FULL specified by a keyboard is to designate a full-amplitude type pattern so that a semi-circle generating direction is changed for every period. In general, the interpolation pitch hy with respect to Y repeats a cycle of (positive→negative) whenever a ¼ circle is generated in one fundamental block cycle; however, when the signal FULL is provided, it repeats a cycle of (positive→negative)→(negative→positive).

An overflow signal AR provided by the X register 315 is used as an all reset signal which restores the state of the digital signal generating device to its initial state. This signal has a terminal discriminating function; that is, it is a signal indicating the completion of one fundamental block of a stitch pattern.

A logical circuit 318 comprises a counter essentially. When the reverse calculation instruction REV2 is applied to the logical circuit 318, the latter 318 applies a triple stitch designating signal (forward→reverse→forward) to the sign decision circuit 308. The reverse calculation instructions REV1 and REV2 are provided by depressing the respective push button switches on a switch panel. In FIG. 3, reference numeral 319 designates a feed register resetting signal FR generating circuit.

Figure 4:
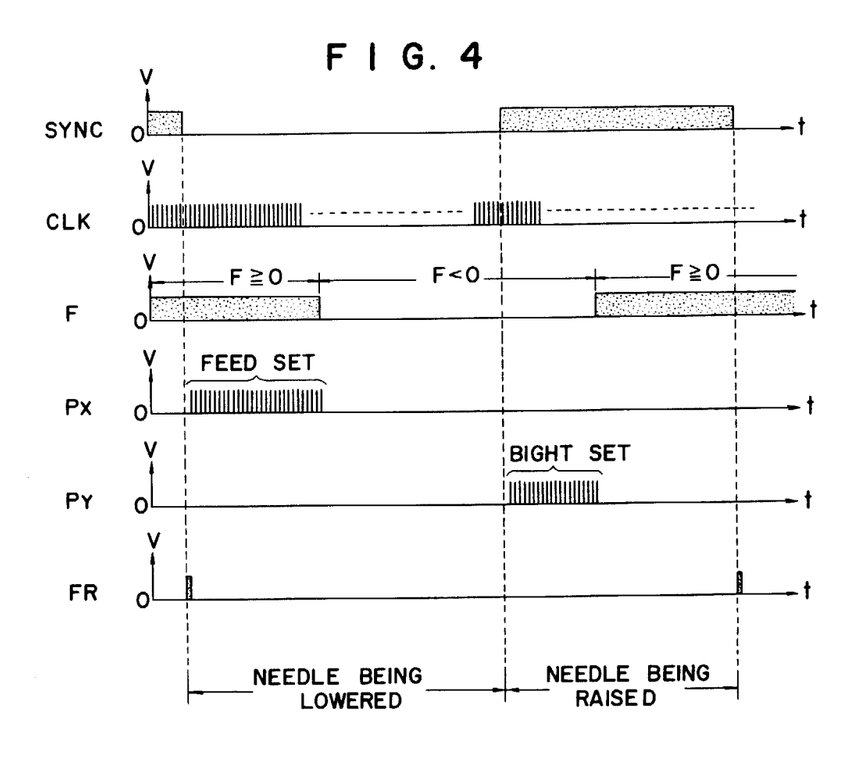
FIG. 4 is a time chart showing signals in various sections in the digital signal generating device shown in FIG. 3.

FIG. 4 is a time chart indicating signals in various circuits in FIG. 3. In FIG. 4, reference characters V and t designate voltage and time, respectively.

Referring to FIG. 4, reference character SYNC designates a sychronous signal which is provided by a pulse generator (not shown) which is adapted to apply to the digital signal generating device movement start instructions in the bight direction and in the feed direction according to the rotational position of the arm shaft moving the machine sewing needle or the vertical position of the needle. The synchronous signal is at a high level when the needle is raised, but it is at a low level when lowered.

Referring to FIG. 4 again, reference character CLK designates a clock signal; F, a signal representative of the sign of contents stored in the register 307 in FIG. 3; Px, an X direction addition pulse; and Py, a Y direction addition pulse.

The feed data Fe is set by the X direction addition pulse Px. The X direction addition pulse Px is delivered later by one pulse than the output pulse of the adder 306. Setting the feed data Fe is carried out while the needle is stitching the cloth or when the synchronous signal SYNC is at the low level. It should be noted that this feed data is for the next stitching.

The bight data B is set by the Y direction addition pulse Py. The Y direction addition pulse Py is delivered later by one pulse than the output pulse of the adder 306. The bight data B is set when the needle is raised. Thus, the following bight data B that is the position of the needle is determined.

By these pulses Px and Py, the needle is moved to the designated position, while the cloth is fed as much as the previously set feed data Fe by a feed dog (not shown).

The feed register resetting signal FR is provided at the beginning of one period of the synchronous signal SYNC to reset the feed register 316. Whenever the signal Fe corresponding of one feeding amount is delivered, the signal FR resets the feed register 316 so that the latter is ready for delivering the following feed data (X direction change component).

Figure 5:
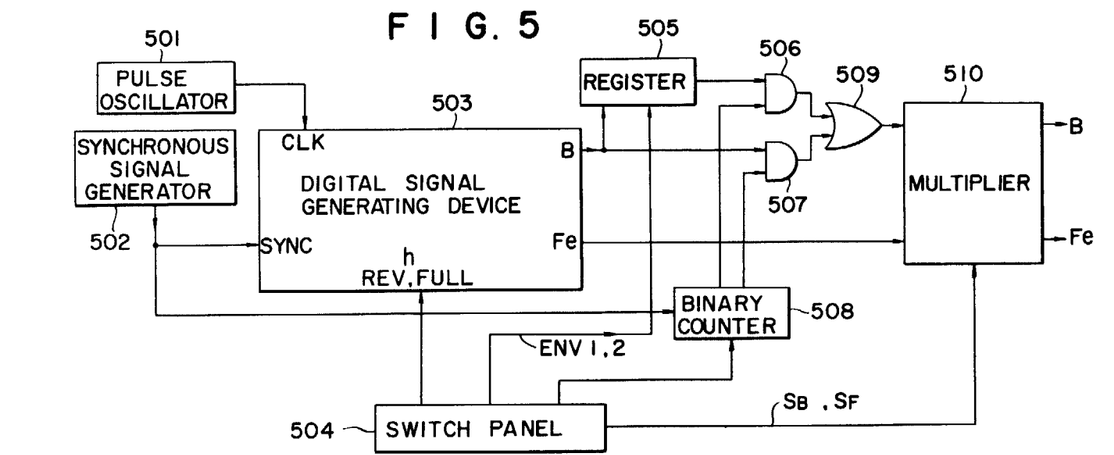
FIG. 5 is a block diagram showing a fundamental pattern generating device employing the digital signal generating device.

FIG. 5 is a block diagram showing a fundamental pattern generating device employing the digital signal generating device 503 described above.

The fundamental pattern generating device comprises: a pulse oscillator 501 for generating a clock pulse; a synchronous signal generator 502, the oscillator 501 and the generator 502 applying a clock signal CLK and a synchronous signal SYNC to the digital signal generating device 503; a switch panel 504, which may be a keyboard for instance, operates to apply the interpolation pitch h, the reverse calculation instructions REV1 and REV2 and the full-amplitude pattern designating signal FULL to the digital signal generating device 503; and a register 505 in which envelope curve designating signals ENV1 and ENV2 from the switch panel 504 are set as described later.

The fundamental pattern generating device further comprises: AND gates 506, and 507; an OR gate 509; and a binary counter 508. The binary counter counts up at the rise of the synchronous signal. Upon application of an envelope curve sequence designating signal from the switch panel 504, the binary counter permits the AND gates 506 and 507 to perform the sequence control of alternately obtaining the bight data B from the digital signal generating device 503 and the register 505.

When the envelope curve designation is not made, the AND gate 507 is maintained open, and the bight data signal B of the digital signal generating device 503 is applied directly to a multiplier 510.

In order to designate the size of an actual stitch pattern, parameters $S_B$ and $S_F$ are applied to the multiplier 510 by the switch panel 504, and the bight data B and the feed data Fe are multiplied by $S_B$ and $S_F$, respectively. In other words, as only the configuration of the pattern is defined in a function generating plane and the size thereof is standardized, the size of the actual stitch pattern is designated.

Figure 6:
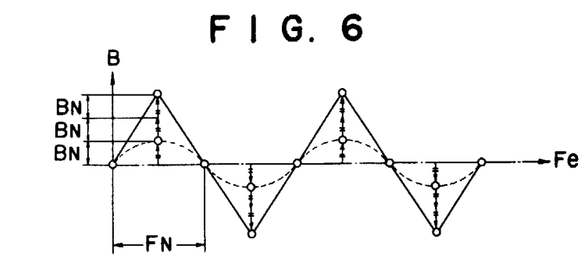
FIG. 6 is an explanatory diagram showing one example of a zigzag stitch pattern.

FIG. 6 is an explanatory diagram showing one example of a zigzag stitch pattern. In this example, the interpolation pitch h gives three interpolation points during one period, none of the reverse calculation instructions REV1 and REV2 are provided, the full-amplitude signal FULL is specified, and the multiplying factors $S_B=3$ and $S_F=1$. In FIG. 6, reference characters $B_N$ and $F_N$ designate the standardized values of the bight data B and the feed data Fe, respectively, and the mark (o) on the solid line designates a needle stitch position.

Figure 7:
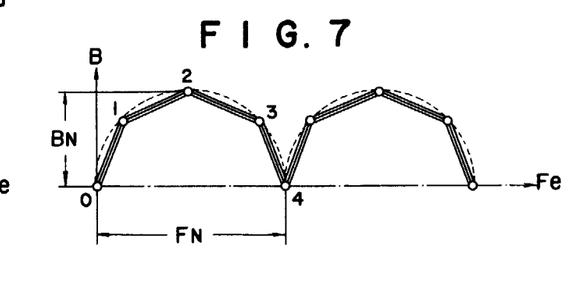
FIG. 7 is also an explanatory diagram showing one example of a triple stitch pattern.

FIG. 7 shows one example of a triple stitch pattern. In this case, the interpolation pitch h gives three interpolation points, a triple stitch designating signal that is the reverse calculation instruction REV2 is provided, and the multiplying factor $S_B=S_F=1$.

Accordingly, the needle makes the first forward movement (0→1→2→3→4→), a reverse movement (4→3→2→1→0) and the second forward movement (0→1→2→3→4), and then starts the following stitching.

Figure 8:
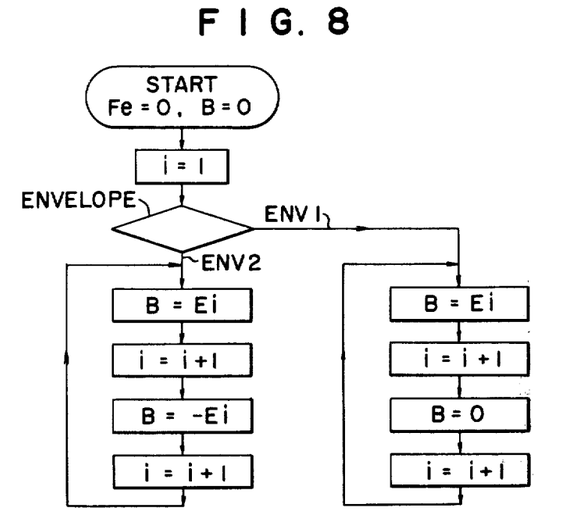
FIG. 8 is a flow chart for generating a zigzag pattern with an envelope.

FIG. 8 is a flow chart for generating a zigzag pattern having an envelope curve.

When an envelope is given, it is decided by the switch panel whether it is for a designation signal ENV1 designating one side of the feed axis or for a designation signal ENV2 designating both sides. A bight data $B=\pm E_i$ indicates that the bight data is equal to the Y coordinate of an optional point Ei on an envelope E(UP) or E(DOWN). A start point (Fe=0, B=0) is the original point of a function generating plane.

Figure 9:
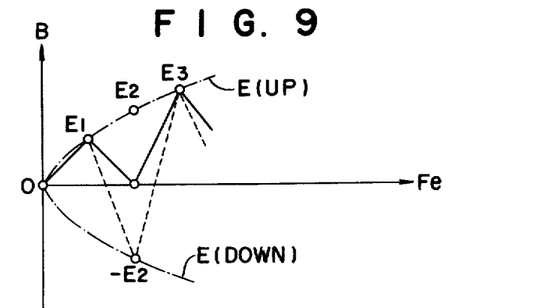
FIG. 9 and FIG. 10 show examples of the zigzag pattern, respectively.

FIG. 9 shows one example of a zigzag pattern having an envelope curve. Upon designation of a one-side envelope E(UP), stitches are specified in the order of $B=+E_1 \rightarrow B=0 \rightarrow B=+E_3$ according to the flow chart in FIG. 8, as indicated by the solid line. Upon designation of both-side envelope curve E(UP) and E(DOWN), stitches are specified in the order of $B=E_1 \rightarrow B=-E_2 \rightarrow B=+E_3$ in accordance with the flow chart in FIG. 8, as indicated by the broken line. These controls are achieved by the binary counter 508 as was described before.

Figure 10:
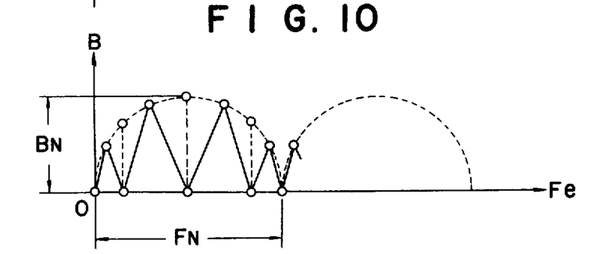

FIG. 10 shows another example of the zigzag pattern having a envelope curve. In this case, an interpolation pitch h giving seven interpolation points is specified, the multiplying factor $S_B=S_F=1$, no reverse signal is provided, and the envelope designating signal ENV1 (one-side) is provided. In FIG. 10, reference characters $F_N$ and $F_B$ designate standardized feed data and bight data, respectively.

Figure 11:
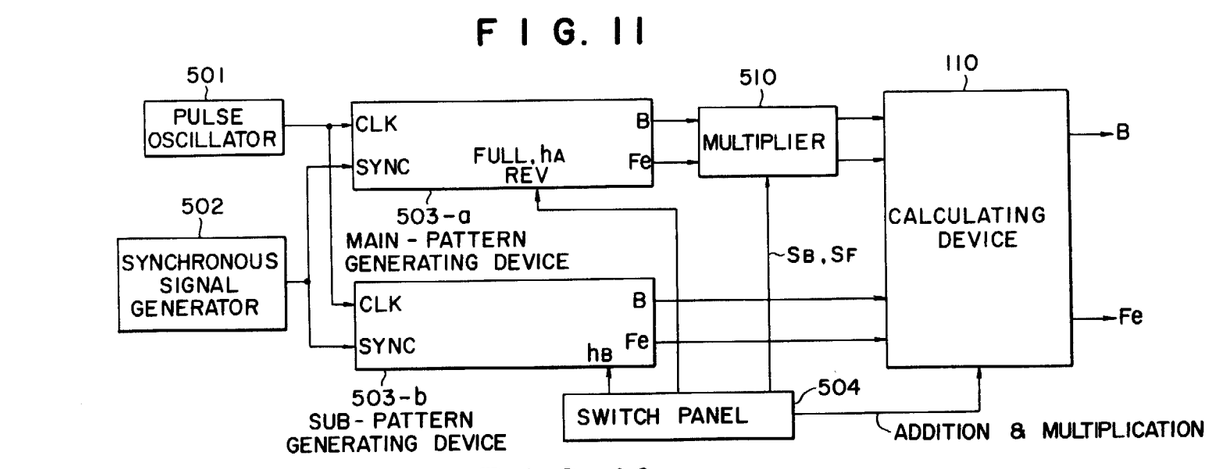
FIG. 11 is a block diagram showing a compound pattern generating device employing a plurality of digital signal generating devices according to the invention.

FIG. 11 is a block diagram showing a compound pattern generating device using a plurality of digital signal generating devices according to the invention.

More specifically, the compound pattern generating device comprises: two digital signal generating devices, or a main-pattern generating device 503-a and a sub-pattern generating device 503-b; and a calculating device 110.

That is, the embodiment is provided with two function generating devices, the function generation results of which are subjected to a calculation, to thereby obtain a compound pattern.

The main-pattern generating device 503-a operates to provide a basic pattern, and the multiplier 510 is provided at the rear stage of the main pattern generating device 503-a. The sub-pattern generating device 503-b operates to provide a pattern of standardized size. These patterns thus provided are applied to the calculating device 110 where values obtained from the sub-pattern are added to or multiplied by the bight data B and feed data Fe of the main-pattern.

In this embodiment, the addition and multiplication are made for the bight data B of the main pattern. These calculations are specified by the switch panel 504.

Figure 12:
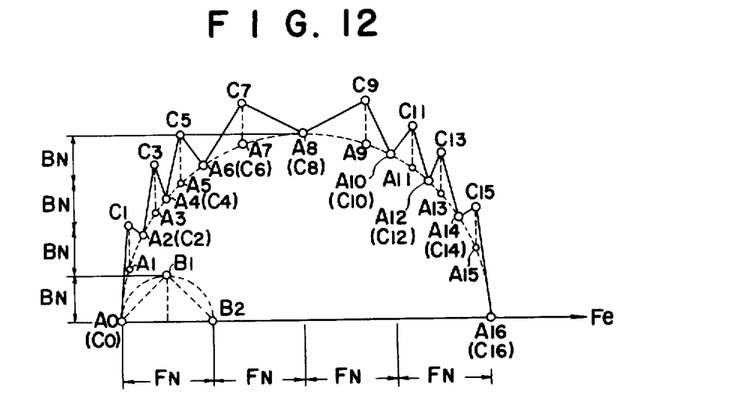
FIGS. 12 and 13 show examples of a compound pattern, respectively.

FIG. 12 shows one example of a compound pattern which is obtained by adding a sub-pattern to the bight data B of a main-pattern.

In this case, an interpolation pitch $h_A$ giving fifteen interpolation points is applied to the main-pattern generating device 503-a in FIG. 11, none of the reverse calculation instructions REV1 and REV2 are provided, and the bight data multiplying factor $S_B=4$ and the feed data multiplying factor $S_F=4$ are applied to the multiplier. In FIG. 12, reference characters $A_1$ through $A_{15}$ designate the aforementioned interpolation points given by the interpolation pitch h.

An interpolation pitch $h_B$ giving one interpolation point $B_1$ is designated for the sub-pattern generating device 503-b in FIG. 11. Then, the switch panel 504 instructs the calculating device 110 to perform addition. In this case, the following calculation is performed:

$$C_i = A_i + B_1 (=1) \quad (i=1, 3, 5, 7 \ldots 15) \tag{2}$$

$$C_i = A_i + B_2 \ (=0) \ (i = 0, 2, 4, 6 \ldots 16) \tag{3}$$

That is, the stitch position $C_0, C_1 \ldots C_{16}$ of the compound pattern are determined so as to satisfy the above Equations.

Figure 13:
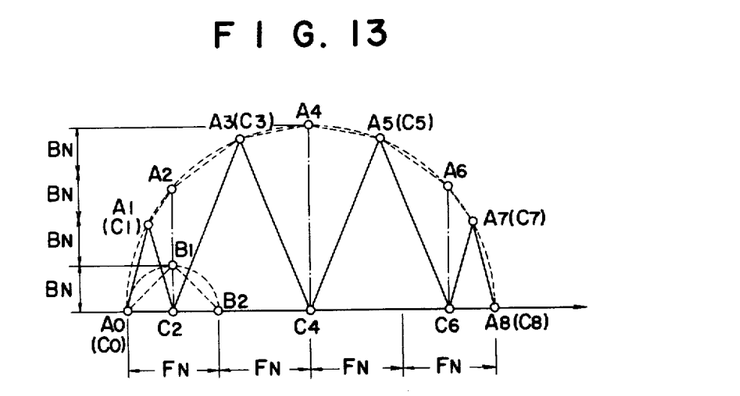

FIG. 13 shows one example of a compound pattern obtained by multiplying the bight data B by a sub-pattern.

The parameters are applied similarly as in the case of FIG. 12. An interpolation pitch $h_A$ giving seven interpolation points is designated for the main-pattern generating device, and an interpolation pitch $h_B$ giving one interpolation point is designated for the sub-pattern generating device. The stitch position $C_i$ is determined so as to meet the following $$C_i = A_i \times B_i \ (=1)(i=1,3,5,7) \tag{4}$$

$$C_i = A_i \times B_i (=o)(i=0,2,4,6,8) \tag{5}$$

Figure 14:
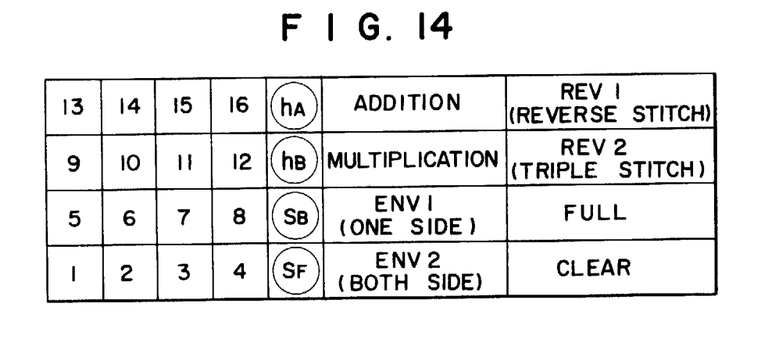
FIG. 14 is an explanatory diagram showing one example of a switch panel.

FIG. 14 shows one example of the switch panel.

In FIG. 14, reference marks $h_A$ and $h_B$ designate keyboard switches for designating interpolation pitches for the main digital signal generating device 503-$a$ and the auxiliary (sub) digital signal generating device 503-$b$, respectively. If it is required to designate interpolation pitches $h_A = 4$ and $h_B = 16$, a number key (4) is depressed after the switch $h_A$ is depressed, and a number key (16) is depressed after the switch $h_B$ is depressed. In this case, signals corresponding to the interpolation pitches $h_A$ (4) and $h_B$ (16) are applied to the respective digital signal generating device by a numerical value decision circuit (not shown) provided at the rear stage of the keyboard.

Reference marks $S_B$ and $S_F$ designate switches for specifying a bight data multiplying factor and a feed data multiplying factor, respectively. In the case where $S_B = 2$ and $S_F = 3$ are specified for instance, a number key (2) is depressed after the switch $S_B$ is depressed, and a number key (3) is depressed after the switch $S_F$ is depressed. In this case, the multiplying factors (2) and (3) are applied to the multiplier 510 (FIG. 11) by the aforementioned numerical value decision circuit.

Reference characters "addition" and "multiplication" designate switches for specifying addition and multiplication of the bight data of a main-pattern provided by the main digital signal generating device 503-$a$. Reference characters "ENV1" and "ENV2" designates switches for designating one side of an envelope curve and both sides, respectively. Reference characters "REV1" and "REV2" designate switches for designating a reverse stitch and a triple stitch, respectively. A key CLEAR is used to clear the various parameters set.

The pulse distribution signal from the digital signal generating device is delivered as the bight signal B and the feed signal Fe. A driving device (such as a stepping motor or a position feedback servo) moving the needle in the bight direction and in the feed direction mechanically with the aid of these signals is well known in the art.

As is apparent from the above description, the automatic pattern generation type sewing machine according to the invention is capable of forming a variety of stitch patterns by using the function generating circuit without successively storing stitches in stitch patterns.

What is claimed is:

1. In an automatic pattern generation type sewing machine, a digital signal generating device including function generation means for sequentially calculating stitch positions in accordance with an arithmetic function and selected input parameters and means for outputting digital signals corresponding to the calculated stitch positions, said function generation means being operable in accordance with signals synchronous with the rotation of the arm shaft of the sewing machine and with pulses from a clock pulse generator which have a higher frequency than said synchronous signals, and a servo driving device which employs said digital signals as feed and bight positions of the needle of said sewing machine to move a piece of cloth or the needle and thereby form a particular stitch pattern.

2. A machine as claimed in claim 1, wherein said function generating device generates a single function and includes means for producing different pattern positions in accordance with different input parameters.

3. A machine as claimed in claim 1, wherein there are a plurality of digital signal generating devices each having a function generation means for calculating stitch positions, and calculating means for performing an arithmetic operation on the outputs from said digital signal generating devices for producing a compound stitch pattern.

4. A machine as claimed in claim 1, wherein means are provided for causing said needle to return to its initial position after the needle has reached a predetermined position in order to repeat the pattern.

5. A machine as claimed in claim 1, further comprising means to form a zigzag pattern utilizing the function as an envelope curve.

6. A machine as claimed in claim 1, wherein said function generation means is operable to cause any pattern to be retraced.

7. A machine as claimed in claim 1, wherein the input parameters for generating a desired pattern are input by means of a keyboard.

8. A machine as claimed in claim 1 wherein means are provided to modify the signals from the digital signal generating device in accordance with different input parameters to produce different patterns.

* * * * *